US011888242B2

(12) United States Patent
Yang

(10) Patent No.: US 11,888,242 B2
(45) Date of Patent: Jan. 30, 2024

(54) STACKED PATCH ANTENNAS USING DIELECTRIC SUBSTRATES WITH PATTERNED CAVITIES

(71) Applicant: NovAtel Inc., Calgary (CA)

(72) Inventor: Ning Yang, Calgary (CA)

(73) Assignee: NovAtel Inc., Calgary (CA)

( * ) Notice: Subject to any disclaimer, the term of this patent is extended or adjusted under 35 U.S.C. 154(b) by 344 days.

(21) Appl. No.: 17/235,639

(22) Filed: Apr. 20, 2021

(65) Prior Publication Data

US 2021/0257737 A1 Aug. 19, 2021

Related U.S. Application Data

(63) Continuation of application No. 16/566,096, filed on Sep. 10, 2019, now Pat. No. 10,985,467, which is a continuation of application No. 15/151,122, filed on May 10, 2016, now Pat. No. 10,454,174.

(51) Int. Cl.
*H01Q 1/38* (2006.01)
*H01Q 9/04* (2006.01)

(52) U.S. Cl.
CPC ............. *H01Q 9/0414* (2013.01); *H01Q 1/38* (2013.01); *H01Q 9/04* (2013.01)

(58) Field of Classification Search
CPC ........... H01Q 9/0414; H01Q 1/38; H01Q 9/04
USPC .................................................... 343/700 MS
See application file for complete search history.

(56) References Cited

U.S. PATENT DOCUMENTS 3,621,154 A * 11/1971 Kogen .................. H04R 21/02 381/175
4,089,003 A * 5/1978 Conroy ................ H01Q 9/0414 343/846
4,316,194 A 2/1982 De Santis
5,245,745 A 9/1993 Jensen et al.
5,300,936 A 4/1994 Izadian
5,386,215 A 1/1995 Brown
5,444,452 A * 8/1995 Itoh .......................... H01Q 5/42 343/769
6,091,367 A 7/2000 Kabashima et al.
(Continued)

FOREIGN PATENT DOCUMENTS

CN 101299486 A 11/2008
CN 101378146 A 3/2009
(Continued)

OTHER PUBLICATIONS

Courtay, Alan, et al., "Microstrip Antennas on Localized Micromachined Dielectric Substrates," Antennas and Propagation Society International Symposium, 1996, AP-S. Digest, vol. 2, pp. 1246-1249.
(Continued)

*Primary Examiner* — Hai V Tran
(74) *Attorney, Agent, or Firm* — Cesari and McKenna, LLP

(57) ABSTRACT

A GNSS RHCP stacked patch antenna with wide dual band, high efficiency and small size is made of a molded high-permittivity material, such as ceramics, with a patterned cavity in the dielectric substrate. The perforated cavities in the substrate reduce the effective dielectric constant, increase the bandwidth and efficiency. The high-order modes can be manipulated through the design of cavities.

20 Claims, 7 Drawing Sheets

(56) References Cited

U.S. PATENT DOCUMENTS

| | | | | |
|---|---|---|---|---|
| 6,118,406 | A * | 9/2000 | Josypenko | H01Q 5/378 343/700 MS |
| 6,281,848 | B1 | 8/2001 | Nagumo | |
| 6,307,509 | B1 | 10/2001 | Krantz | |
| 6,992,636 | B2 | 1/2006 | Tebbe et al. | |
| 7,026,994 | B2 | 4/2006 | Ikuta | |
| 7,295,167 | B2 * | 11/2007 | Aminzadeh | H01Q 5/40 343/846 |
| 7,353,592 | B2 | 4/2008 | Tebbe et al. | |
| 8,111,196 | B2 * | 2/2012 | Thiam | H01Q 5/40 455/78 |
| 9,196,965 | B2 | 11/2015 | Sabielny | |
| 9,647,328 | B2 | 5/2017 | Dobric | |
| 10,454,174 | B2 | 10/2019 | Yang | |
| 2002/0075186 | A1 * | 6/2002 | Hamada | H01Q 1/36 343/702 |
| 2004/0021606 | A1 | 2/2004 | Shigihara et al. | |
| 2004/0257279 | A1 | 12/2004 | Tebbe et al. | |
| 2005/0200532 | A1 * | 9/2005 | Tebbe | H01Q 15/006 343/700 MS |
| 2008/0297417 | A1 | 12/2008 | Austin et al. | |
| 2009/0058731 | A1 | 3/2009 | Geary et al. | |
| 2010/0255261 | A1 | 10/2010 | Schwanke et al. | |
| 2011/0063174 | A1 | 3/2011 | Cho et al. | |
| 2013/0189935 | A1 | 7/2013 | Nair et al. | |
| 2014/0057072 | A1 | 2/2014 | Liu et al. | |
| 2014/0285382 | A1 | 9/2014 | Dobric | |
| 2016/0013558 | A1 | 1/2016 | Hwang et al. | |

FOREIGN PATENT DOCUMENTS

| | | | |
|---|---|---|---|
| CN | 102255140 | | 11/2011 |
| CN | 101420066 | | 4/2013 |
| CN | 101931122 | | 4/2013 |
| CN | 103457029 | | 12/2013 |
| CN | 203660051 | U | 6/2014 |
| CN | 102760954 | | 12/2014 |
| CN | 103107424 | | 12/2014 |
| CN | 204011731 | | 12/2014 |
| CN | 102706955 | | 2/2015 |
| CN | 102790288 | | 3/2015 |
| CN | 104577316 | | 4/2015 |
| CN | 102176545 | | 6/2015 |
| EP | 1489687 | A1 | 12/2004 |
| JP | H8-298407 | | 11/1996 |
| JP | H09-98016 | | 4/1997 |
| JP | H09-130136 | | 5/1997 |
| JP | 2002-217638 | | 8/2002 |
| JP | 2005012791 | | 1/2005 |
| KR | 10-2011-028143 | A | 3/2011 |

OTHER PUBLICATIONS

Waterhouse, R.B., "Design of Probe-Fed Stacked Patches," IEEE Transactions on Antennas and Propagation, vol. 47, No. 12, Dec. 1999, pp. 1780-1784.

Yang, David Hung-Yu, et al., "Photonic Band-Gap Materials for High-Gain Printed Circuit Antennas," Antennas and Propagation, IEEE Transactions on, vol. 45, No. 1, Jan. 1997, pp. 185-187.

Search Report issued in international application No. PCT/CA2017/050024, dated Feb. 13, 2017.

Extended European Search Report dated Nov. 25, 2019 for European Patent Application No. 17795212.4 for NovAtel, Inc., 9 pages.

* cited by examiner

STACKED PATCH ANTENNAS USING DIELECTRIC SUBSTRATES WITH PATTERNED CAVITIES

CROSS-REFERENCE TO RELATED APPLICATIONS

The present application is a continuation of commonly assigned copending U.S. patent application Ser. No. 16/566,096, filed on Sep. 10, 2019, by Ning Yang for STACKED PATCH ANTENNAS USING DIELECTRIC SUBSTRATES WITH PATTERNED CAVITIES, which is a continuation U.S. patent application Ser. No. 15/151,122, which was filed on May 10, 2016, by Ning Yang for STACKED PATCH ANTENNAS USING DIELECTRIC SUBSTRATES WITH PATTERNED CAVITIES, which are both hereby incorporated by reference.

BACKGROUND

A patch antenna is often utilized as a low-profile and low-cost multi-constellation global navigation satellite system (GNSS) antenna due to its planar configuration and is ease of integration with circuit boards. To shrink the size of the antenna, it is well known in the art to use ceramic material as the substrate. Typical considerations of using ceramics are its high DK (ε', dielectric constant) and low dielectric loss. Depending on the compounds and composites, the DK of the ceramics can vary from the range of approximately 4 to several hundred. To cover the dual-band requirements of a typical GNSS system, two or more stacked patches are required to resonate at each frequency. For circular patches, the fundamental mode of operation is TM11 mode, which has an upper-hemisphere radiation pattern that works well for GNSS applications. Using the well known cavity model, the fundamental mode's resonance frequency is given by $$(f_r)_{11} = \frac{\chi_{11} c}{2\pi a_{eff}\sqrt{\varepsilon_{eq}}},$$

where $\chi_{11}$ represents the first zero of the derivative of the Bessel function, $J_1'(\chi)=0$, $a_{eff}$ is the effective radius of the circular patch disk, $\varepsilon_{eq}$ is the equivalent dielectric constant and c is the speed of light. Using the same material as substrate, the sizes of the two patches are significantly different: the top one resonating at the L1 band is roughly about 77% of the L2 patch at the bottom layer. Therefore, the overall lateral size of the antenna is determined by the bottom radiator. Using ceramic as substrate reduces the size of the antenna, but as a noted disadvantage, it also narrows the bandwidth since the quality factor Q of the resonant antenna is inversely proportional to the volume it physically occupy according to Chu-Harrington limit for electrically small antennas.

SUMMARY

The disadvantages of the prior art are overcome by utilizing a stacked patch antenna using an exemplary molded ceramic puck with perforated air-cavities as the substrate. Illustratively, the substrate for the antenna is not completely filled with ceramic, but some part filled with air. The effective permittivity in the perforated dielectric region is determined from the porosity, or void fraction of the perforation, defined as the fraction of the volume of the voids-space over the total bulk volume of the material.

By having a ceramic puck with one or more perforated air cavities, a number of noted advantages are obtained. By introducing perforation to the dielectric substrate for the top layer patch of the stacked antenna, the effective permittivity in the patterned area of the ceramic is reduced so that the L1-band resonance occupied volume is illustratively increased without changing the overall material weight significantly. Through this, the Q-factor decreases and the operation bandwidth is substantially widened. At the same time, the weight of the ceramic is decreased due to the perforation. Further, the electromagnetic field distribution at resonance is changed by the perforation in the substrate. This gives the designer the flexibility to change the size of the patches, and therefore the bandwidth by varying the perforation position, size and pattern.

Using illustrative dual-band stacked patch antenna, only one set of direct feeds to the top patch radiator is applied since the excitation of the bottom patch (L2 band) element is is through parasitic coupling. The stacked patch can be modeled by two coupled resonators. The coupling affects the impedance bandwidth of the bottom patch element; therefore the capability of varying the top patch size facilitates possible control over the coupling and the impedance matching.

Further, by manipulating the positions where the cavities are located, the frequency ratio between the high order mode and fundamental mode can be controlled. This is possible as the voltage peaks for different modes of resonating standing waves are located at different regions of the antenna. This is especially useful in the situation where harmonic or higher-frequency radiation needs to be controlled.

BRIEF DESCRIPTION OF THE DRAWINGS

The description below refers to the accompanying drawings, of which.

DETAILED DESCRIPTION OF AN ILLUSTRATIVE EMBODIMENT

In accordance with an illustrative embodiment of the present invention, the bandwidth of an exemplary ceramic antenna is designable and flexible. Illustratively, this is achieved by molding the ceramic with perforated cavities and using the perforated ceramic as the substrate for an exemplary patch antenna. The reason for perforating cavities, rather than holes, is to keep top-surface of the ceramic unaffected so that the same metallization process as conventional non-perforated ceramic may be used in accordance with illustrative embodiments of the present invention.

Figure 1:
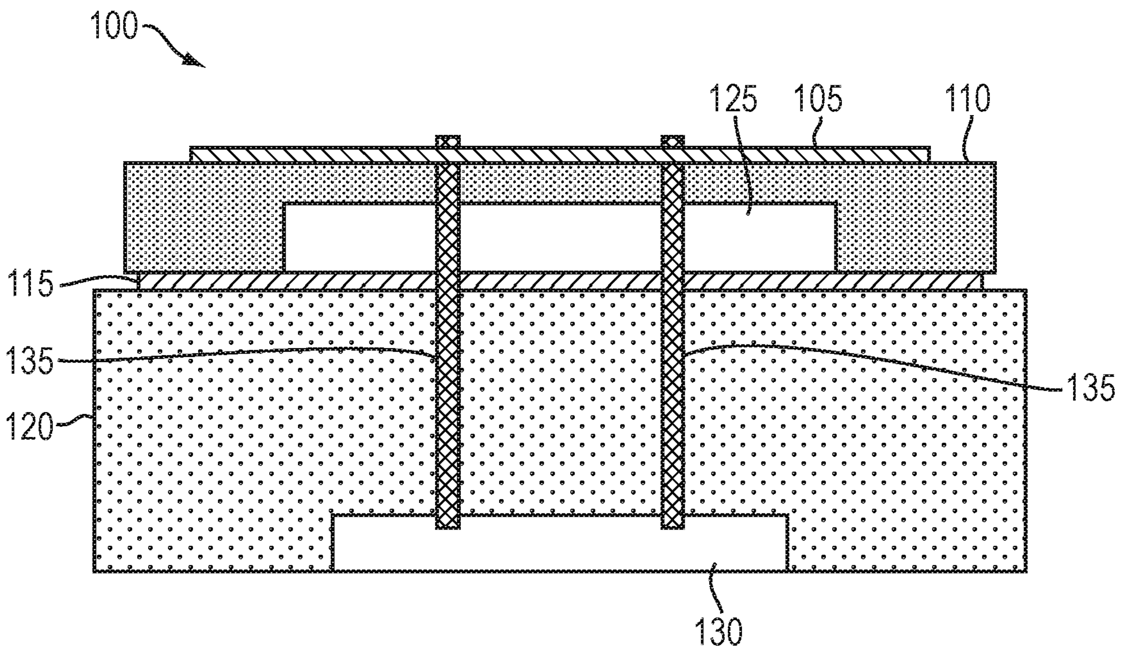
FIG. 1 is a side view of an exemplary stack patch antenna in accordance with an illustrative embodiment of the present invention.

FIG. 1 is a side view of an exemplary dual stack patch antenna 100 in accordance with an illustrative embodiment of the present invention. The dual stack patch antenna 100 illustratively comprises of a first metal layer 105, a first ceramic layer 110, a second metal layer 115 and a second ceramic layer 120. Illustratively, the first metal layer is disposed on a top surface of the first ceramic later 110. The second metal later 115 is disposed between a bottom surface of the first ceramic layer and a top surface of the second ceramic layer 120.

The first ceramic layer 110 comprises a cavity 125 that comprises of an air void. Illustratively, the cavity 125 may range in size in accordance with alternative embodiments of the present invention. As such, the description or depiction of the cavity 125 should be taken as exemplary only. Similarly, the second ceramic layer 120 comprises of a second cavity 130 that may range in size in accordance with alternative embodiments of the present invention. Illustratively, both cavities 125, 130 are located on a bottom portion of the respective ceramic layers 110, 120. That is, the cavities 125, 130 are located on a bottom side of the respective ceramic layers. In accordance with an illustrative embodiment of the present invention, a volume of the first cavity 125 is larger than a volume of the second cavity 130. However, in alternative embodiments, the two cavities may have the same and/or differing volumes. As such, the description of the first cavity having a larger volume than the second cavity should be taken as exemplary only.

Additionally one or more through holes 135 are provided to enable feed wires and/or pins to be passed to the first metal layer 105 and/or the second metal layer 115 in accordance with illustrative embodiments of the present invention. In accordance with an illustrative embodiment, there are four (4) through holes 135. However, it should be noted that in alternative embodiments of the present invention varying numbers of through holes may be utilized. As such, the description of four through holes should be taken as exemplary only.

Figure 2:
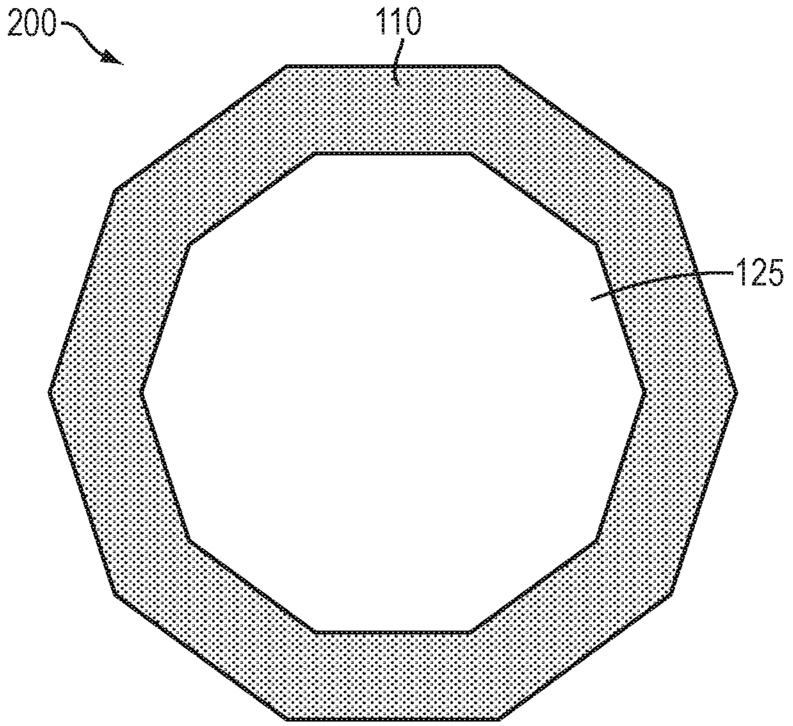
FIG. 2 is a bottom view of ceramic component of a patch antenna showing a cavity in accordance with an illustrative embodiment of the present invention.

FIG. 2 is a bottom view 200 of ceramic component 110 of a patch antenna showing a cavity 125 in accordance with an illustrative embodiment of the present invention. In view 200, the ceramic component 110 has 10 sides and the cavity 125 is similarly ten sided. It should be noted that in accordance with alternative embodiments of the present invention, the ceramic component and/or cavity may have differing geometries. For example, both may be substantially circular in shape, etc.

Figure 3:
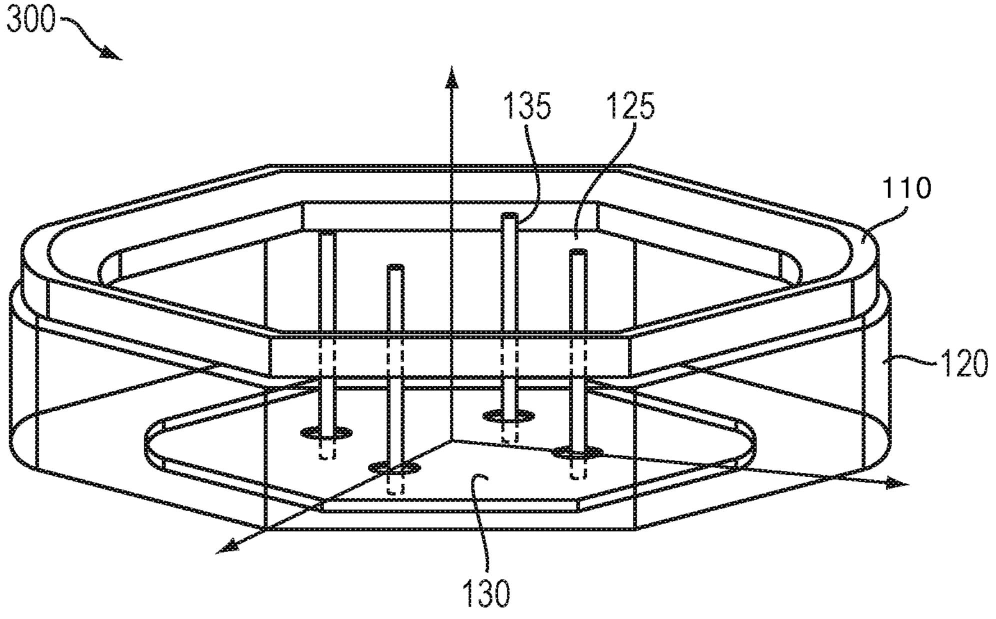
FIG. 3 is a perspective view of an exemplary stack patch antenna in accordance with an illustrative embodiment of the present invention.

FIG. 3 is a perspective view 300 of an exemplary stack patch antenna 100 in accordance with an illustrative embodiment of the present invention. The view 300 is a cut away view showing the various components of the antenna 100. The view 300 illustrative the plurality of through holes 135 extending from a base of the antenna 100. The view 300 further illustrates the first metal layer 105 disposed on top of the first ceramic layer 110 having a cavity 125. The second metal layer 115 is then disposed on top of the second ceramic layer 120 having a second cavity 130.

Figure 4:
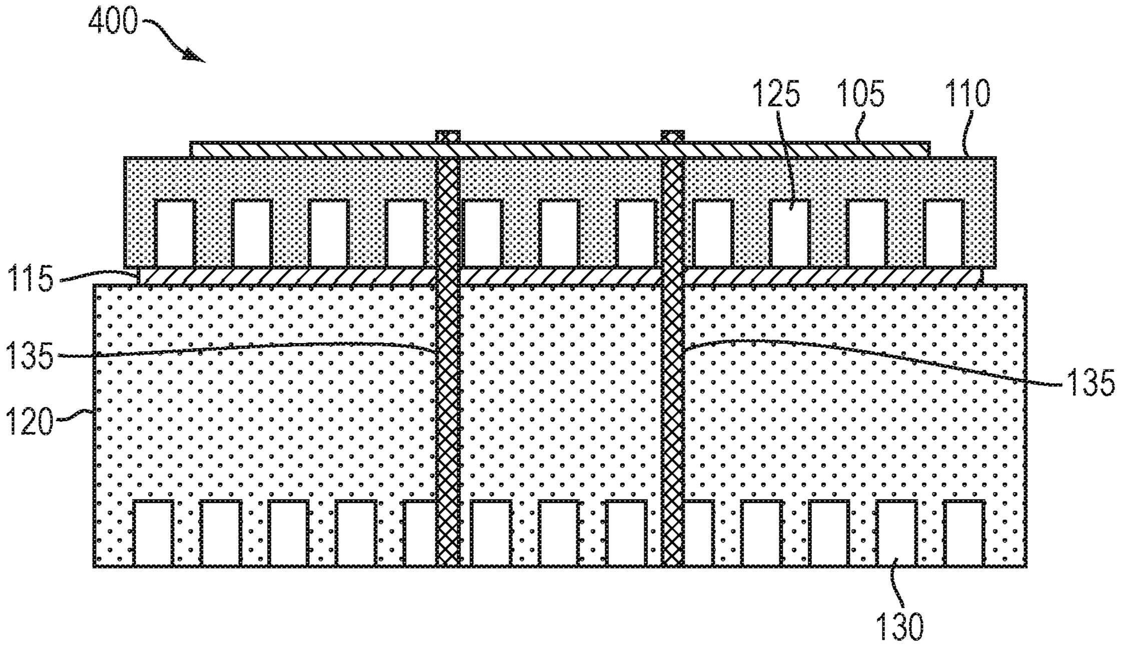
FIG. 4 is a side view of an exemplary stack patch antenna having a plurality of cavities in accordance with an illustrative embodiment of the present invention.

FIG. 4 is a side view of an exemplary stack patch antenna 400 having a plurality of cavities in accordance with an illustrative embodiment of the present invention. Illustratively, the antenna 400 comprises of a first metal layer 105 disposed on the top of is a first ceramic layer 110. A second metal layer 115 is disposed between a bottom side of the first ceramic layer 110 and a top side of the second ceramic layer 120, one or more though holes 135 are arranged through the various layers to enable a signal to be fed/received from the first metal layer 105. In accordance with alternative embodiments of the present invention a plurality of cavities 125 are disposed along the bottom of the first ceramic layer 120. Similarly, a plurality of cavities 130 are disposed along a bottom side of the second ceramic layer 120.

Figure 5:
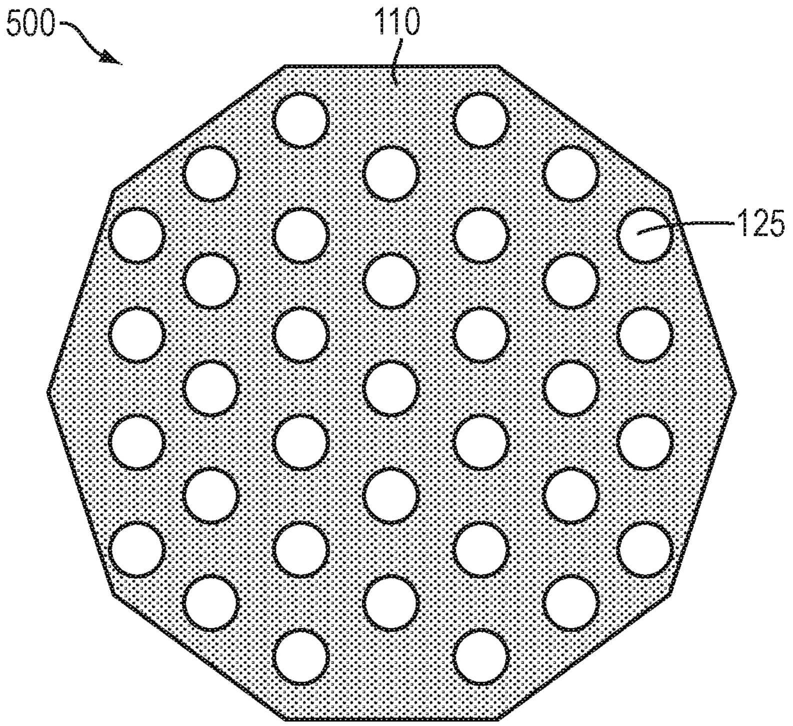
FIG. 5 is a bottom view of ceramic component of a patch antenna showing a is plurality of cavities in accordance with an illustrative embodiment of the present invention.

FIG. 5 is a bottom view 500 of ceramic component 110 of a patch antenna 400 showing a plurality of cavities 125 in accordance with an illustrative embodiment of the present invention. As noted above in reference to FIG. 4, each of the ceramic layers 110, 120 include a plurality of cavities 125, 130. In accordance with an illustrative embodiment of the present invention, the cavities are configured in a round shape. However, in accordance with alternative embodiments of the present invention, the cavities may have any shape and/or size. As such, the depiction of the cavities 125 should be taken as exemplary only. Further, while FIG. 5 depicts cavities 125 within first ceramic layer 110, the cavities 130 within second ceramic layer 120 may be similarly arranged. As such, the description of FIG. 5 being in reference to first ceramic layer 110 should be taken as exemplary only. It should be noted that in accordance with an illustrative embodiment of the present invention, the plurality of cavities in a ceramic layer are arranged in a symmetric or substantially symmetric manner.

Figure 6A:
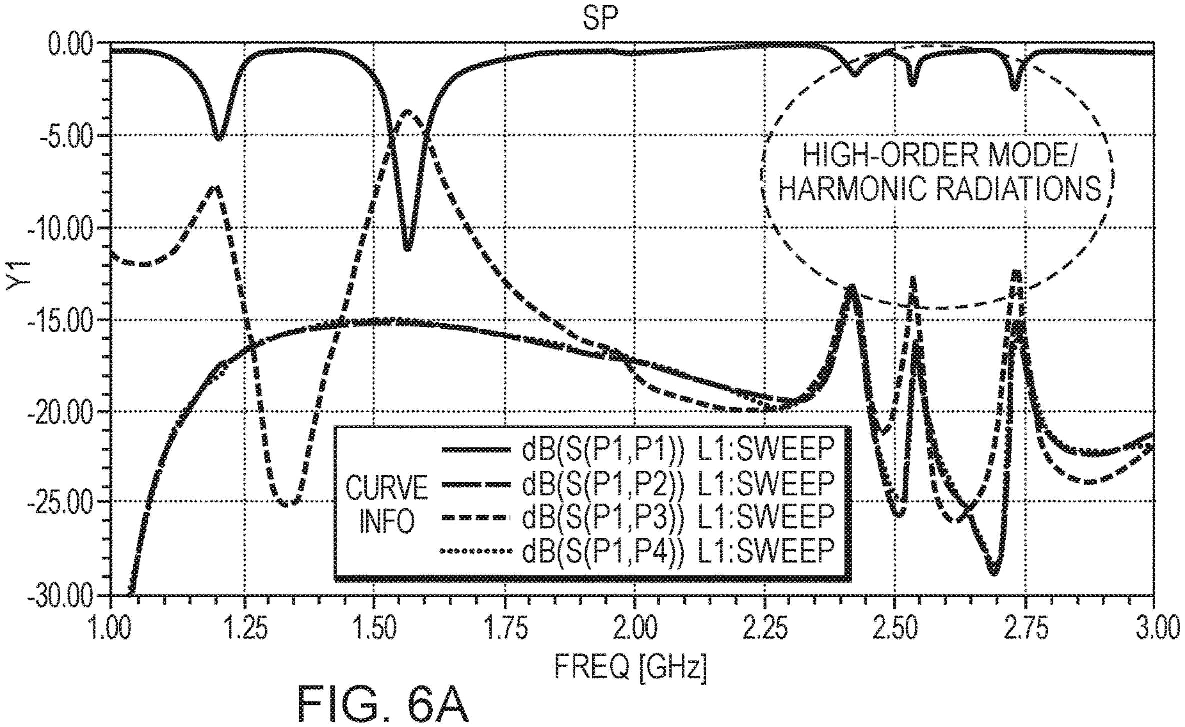
FIG. 6A is a chart illustrating the antenna without perforation in accordance with an illustrative embodiment of the present invention.
Figure 6B:
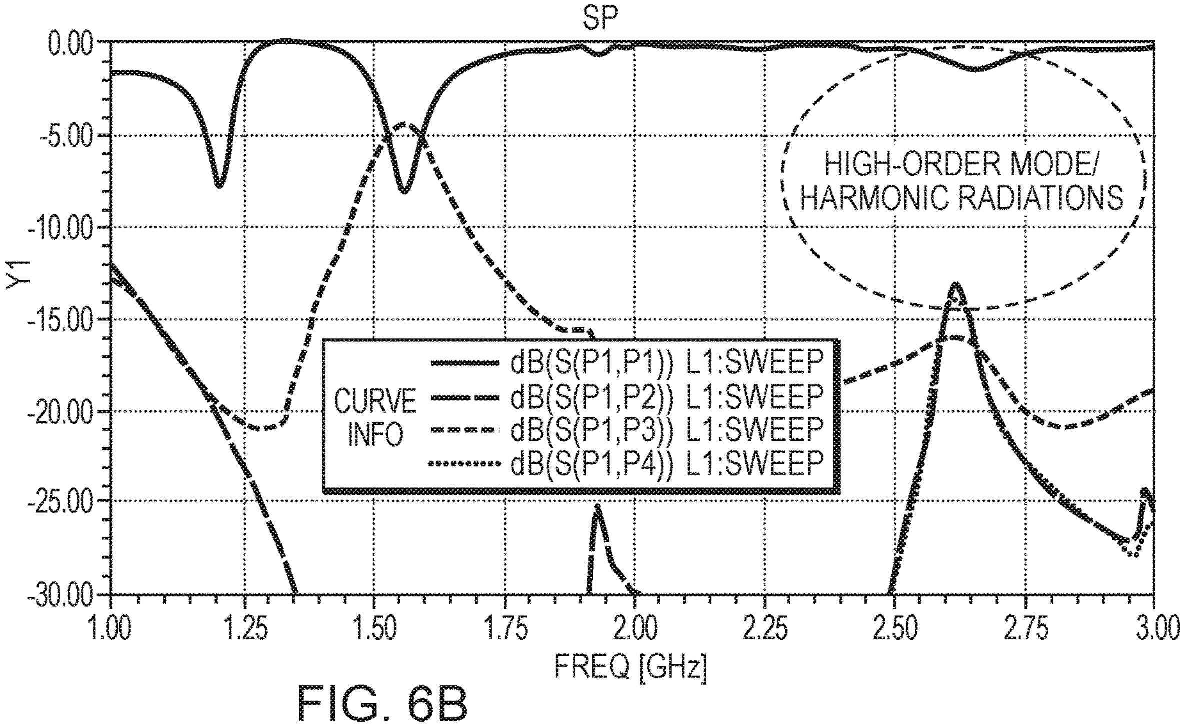
FIG. 6B is a chart illustrating the antenna with perforation in accordance with an illustrative embodiment of the present invention.

FIG. 6A is a chart illustrating an illustrative antenna without perforation in accordance with an illustrative embodiment of the present invention. Similarly, FIG. 6B is a chart illustrating an antenna with exemplary cavity perforations in accordance with an is illustrative embodiment of the present invention. Both FIGS. 6A and 6B illustrate the wideband sweep of the S parameters of an antenna with and without the cavities as described in accordance with illustrative embodiments of the present invention. As will be appreciated by those skilled in the art, those antennas with perforations (i.e., those antennas with cavities in accordance with embodiments of the present invention) may be used to move manipulate the harmonics and control the frequency ratio between the high order mode and the fundamental mode.

Figure 7A:
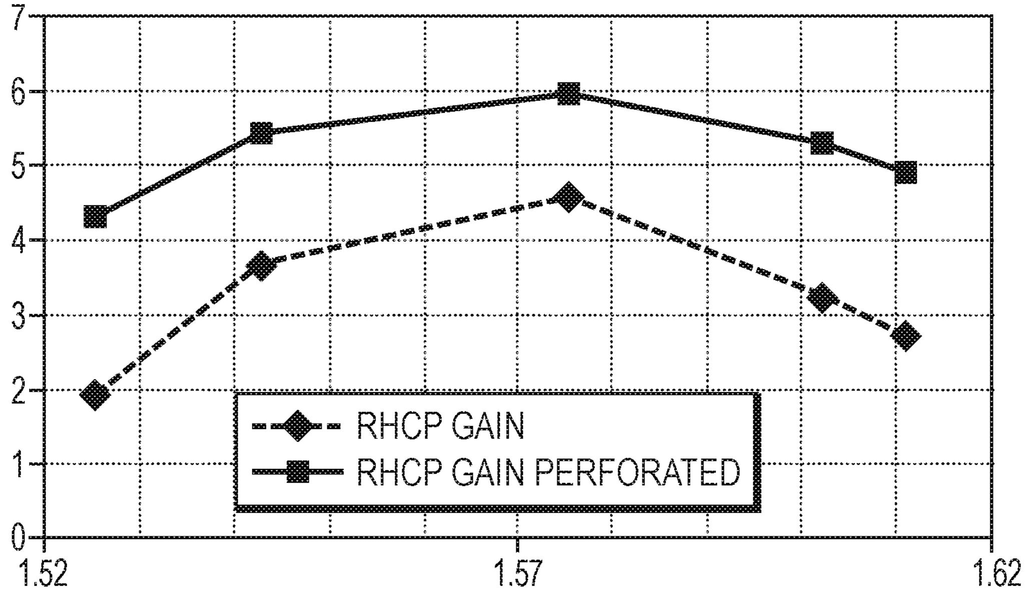
FIG. 7A is a chart illustrating the high band gain of a RHCP antenna with and without perforation in accordance with an illustrative embodiment of the present invention.
Figure 7B:
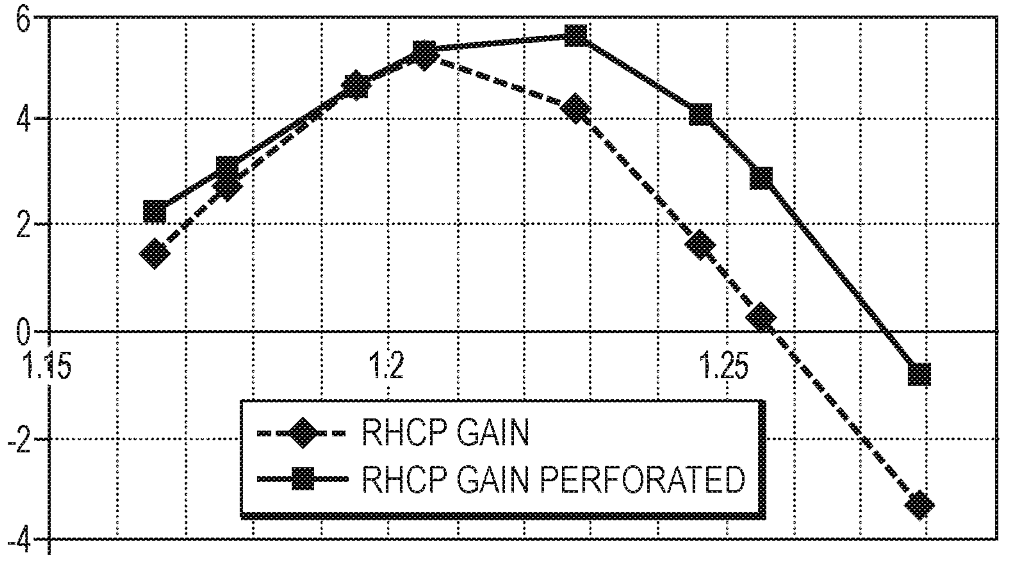
FIG. 7B is a chart illustrating the low band gain of a RHCP antenna with and without perforation in accordance with an illustrative embodiment of the present invention.

FIG. 7A is a chart illustrating the high band gain of a RHCP antenna with and without perforation in accordance with an illustrative embodiment of the present invention. As can be observed from FIG. 7A, there is an improved gain when the antennas have the perforations (cavities) in accordance with an illustrative embodiment of the present invention. FIG. 7B is a chart illustrating the low band gain of a RHCP antenna with and without perforation in accordance with an illustrative embodiment of the present invention. As can be observed from FIG. 7B, there is an improved gain when the antennas have the perforations (cavities) in accordance with an illustrative embodiment of the present invention.

It is expressly contemplated that the principles of the present invention may be implemented in hardware, software, including a non-transitory computer readable media, firmware or any combination thereof. Further, the description of specific sizes and/or numbers of cavities should be taken as exemplary only.

What is claimed is:

1. An antenna comprising:

a first metal layer disposed on a first surface of a first substrate;

a second metal layer disposed between a second surface of the first substrate and a first surface of a second substrate;

wherein the first substrate has one or more first cavities, where each of the one or more first cavities does not extend through an entirety of the first substrate to reach the first metal layer:

wherein the second substrate has one or more second cavities, where each of the one or more second cavities does not extend through an entirety of the second substrate to reach the second metal layer; and wherein a bandwidth of the antenna is configured to be modified by varying one or more of (1) positions of the one or more first cavities or the one or more second cavities, (2) sizes of the one or more first cavities or the one or more second cavities, or (3) patterns of the one or more first cavities or the one or more second cavities.

2. The antenna of claim 1 further comprising one or more through holes extending from the first metal layer, through the first substrate, the second metal layer, and the second substrate to enable radio frequency signals to pass to the first metal layer.

3. The antenna of claim 1 wherein the one or more first cavities are disposed against the second metal layer.

4. The antenna of claim 1 wherein the one or more second cavities are disposed on a second surface of the second substrate.

5. The antenna of claim 1 wherein the one or more first cavities include a plurality of first cavities that are arranged substantially symmetrically on the first substrate and the one or more second cavities include a plurality of second cavities that are arranged substantially symmetrically on the second substrate.

6. The antenna of claim 1 wherein each of the one or more first cavities includes a first opening, and each of the one or more first openings opens in a direction towards the second metal layer and away from the first layer, and each of the one or more second cavities includes a second opening, and each of the one or more second openings opens in a direction away from the second metal layer.

7. An antenna comprising:

a first metal layer disposed on a first surface of a first dielectric substrate;

a second metal layer disposed between a second surface of the first dielectric substrate and a first surface of a second dielectric substrate, wherein a second surface of the second dielectric substrate is opposite the first surface of the second dielectric substrate;

wherein the first dielectric substrate includes one or more first cavities, each of the one or more first cavities extending from the second surface of the first dielectric substrate to a first selected depth, through the first dielectric substrate, that does not reach the first surface of the first dielectric substrate;

wherein the second dielectric substrate includes one or more second cavities, each of the one or more second cavities extending from the second surface of the second dielectric substrate, that does not reach the first surface of the second dielectric substrate; and where (1) positions of the one or more first or second cavities are configured to be modified, or (2) a sizes of the one or more first or second cavities are configured to be modified.

8. The antenna of claim 7 further comprising one or more through holes extending from the first metal layer, through the first dielectric substrate, the second metal layer and the second dielectric substrate to enable radio frequency signals to pass to the first metal layer.

9. The antenna of claim 7 wherein the one or more first cavities include a plurality of first cavities that are arranged substantially symmetrically on the first dielectric substrate.

10. The antenna of claim 7 wherein the one or more second cavities include a plurality of second cavities that are arranged substantially symmetrically on the second dielectric substrate.

11. The antenna of claim 7 wherein the one or more first cavities are disposed against the second metal layer.

12. The antenna of claim 7 wherein the one or more second cavities are disposed on the second surface of the second substrate.

13. The antenna of claim 7 wherein each of the one or more first cavities includes a first opening, and each of the one or more first openings opens in a direction towards the second metal layer and away from the first layer, and each of the one or more second cavities includes a second opening, and each of the one or more second openings opens in a direction away from the second metal layer.

14. An antenna comprising:

a first metal layer disposed on a first surface of a first substrate including one or more first air cavities that do not extend through an entirety of the first substrate;

a second metal layer disposed between a second surface of the first substrate and a first surface of a second substrate including one or more second air cavities that do not extend through an entirety of the second substrate;

wherein (1) positions of the one or more first or second air cavities are configured to be modified, or (2) sizes of the one or more first or second air cavities are configured to be modified.

15. The antenna of claim 14 further comprising one or more through holes extending from the first metal layer, through the first substrate, the second metal layer; and the second substrate to enable radio frequency signals to pass to the first metal layer.

16. The antenna of claim 14 wherein the one or more first air cavities are disposed against the second metal layer.

17. The antenna of claim 14 wherein the one or more second air cavities are disposed on a second surface of the second substrate.

18. The antenna of claim 14 wherein each of the one or more first air cavities includes a first opening, and each of the one or more first openings opens in a direction towards the second metal layer and away from the first layer, and each of the one or more second air cavities includes a second opening, and each of the one or more second openings opens in a direction away from the second metal layer.

19. The antenna of claim 14 wherein the one or more first air cavities are disposed against the second metal layer.

20. The antenna of claim 14 wherein the one or more second air cavities are disposed on a second surface of the second substrate.

* * * * *